US008583811B2

(12) United States Patent
Raveendran

(10) Patent No.: US 8,583,811 B2
(45) Date of Patent: Nov. 12, 2013

(54) GATEWAY DEVICE FOR MULTIMEDIA CONTENT

(75) Inventor: Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 318 days.

(21) Appl. No.: 12/765,941

(22) Filed: Apr. 23, 2010

(65) Prior Publication Data

US 2011/0264817 A1    Oct. 27, 2011

(51) Int. Cl.
    G06F 15/16    (2006.01)
(52) U.S. Cl.
    USPC ............ 709/230; 709/204; 709/223; 709/228
(58) Field of Classification Search
    USPC ............ 709/230, 204, 223, 228; 725/131, 62
    See application file for complete search history.

(56) References Cited

U.S. PATENT DOCUMENTS

| | | | | |
|---|---|---|---|---|
| 2009/0100147 | A1* | 4/2009 | Igarashi | 709/218 |
| 2009/0168758 | A1* | 7/2009 | Apelqvist et al. | 370/352 |
| 2009/0222514 | A1* | 9/2009 | Igarashi | 709/203 |
| 2009/0304009 | A1* | 12/2009 | Kolhi et al. | 370/400 |
| 2010/0042746 | A1* | 2/2010 | Keum et al. | 709/245 |
| 2010/0070636 | A1* | 3/2010 | Skog et al. | 709/228 |
| 2010/0138900 | A1* | 6/2010 | Peterka et al. | 726/4 |
| 2010/0205309 | A1* | 8/2010 | Skog et al. | 709/227 |
| 2010/0287480 | A1* | 11/2010 | Hicks et al. | 715/751 |
| 2010/0313225 | A1* | 12/2010 | Cholas et al. | 725/62 |
| 2010/0313235 | A1* | 12/2010 | Straub | 725/131 |
| 2011/0107379 | A1* | 5/2011 | Lajoie et al. | 725/87 |
| 2011/0138064 | A1* | 6/2011 | Rieger et al. | 709/228 |
| 2012/0079029 | A1* | 3/2012 | Damola et al. | 709/204 |

FOREIGN PATENT DOCUMENTS

| | | |
|---|---|---|
| GB | 2419774 A | 5/2006 |
| JP | 2010521837 A | 6/2010 |
| JP | 2011509542 A | 3/2011 |
| JP | 2011525306 A | 9/2011 |

OTHER PUBLICATIONS

International Search Report and Written Opinion—PCT/US2011/033638—ISA/EPO—Jan. 20, 2012.
Johan Hjelm et al: "Bringing IMS Services to the DLNA Connected Home", May 19, 2008, XP055003989, Retrieved from the Internet: URL:http://www.pervasive2008.org/Papers/Workshop/w3-04.pdf [retrieved on Aug. 1, 2011] the whole document.

(Continued)

*Primary Examiner* — Wing F Chan
*Assistant Examiner* — Benjamin M Thieu
(74) *Attorney, Agent, or Firm* — Charles Chesney

(57) ABSTRACT

This disclosure relates to techniques, devices, and systems for using a mobile electronic device to provide multimedia content. One example method of providing multimedia content includes receiving, at an Internet Protocol Multimedia Subsystem (IMS) enabled first electronic device, multimedia content from a content-providing electronic device via an IMS network, where the multimedia content has a first format. The method also includes converting, at the IMS-enabled first electronic device, the multimedia content from the first format to a second format that is different from the first format. The method further includes transmitting, from the IMS-enabled first electronic device to a second electronic device, the converted multimedia content in the second format, where the converted multimedia content is transmitted from the first electronic device to the second electronic device via a local network that is different from the IMS network.

47 Claims, 8 Drawing Sheets

(56) References Cited

OTHER PUBLICATIONS

"Converged Personal Network Service Requirements", Candidate Version 1.0, Open Mobile Alliance OMA-RD-CPNS-V1_0-20091117-C, Nov. 17, 2009, pp. 1-36.

Fasbender, A., et al, "Phone-controlled Delivery of NGN Services into Residential Environments", Proc. of 2nd Int. Conf. on Next Generation Mobile Applications, Services and Technologies, Sep. 16, 2008, p. 196-203.

Hjelm, J., et al., "Delivering Internet Media Services to Consumer Electronics Devices in Personal Networks," Proc. of 7th IEEE Consumer Communications and Networking Conf., Jan. 9, 2010, pp. 1-2.

\* cited by examiner

GATEWAY DEVICE FOR MULTIMEDIA CONTENT

TECHNICAL FIELD

This disclosure relates to providing multimedia content, and more particularly to using a mobile electronic device to provide multimedia content.

BACKGROUND

Internet Protocol Multimedia Subsystem (IMS) is an architectural framework for delivering multimedia and voice over Internet Protocol (IP) services. IMS can be used to provide IMS-enabled wireless or wireline device terminals access to multimedia or voice applications. An IMS-enabled terminal device, such as an IMS-enabled mobile phone, can receive various IMS services over an IMS network, where the IMS services are provided by a central IMS application server.

However, many electronic devices are not IMS-enabled devices, and may thus be unable to receive IMS content or services from an IMS application server over an IMS network. Even when a device is IMS-enabled, the device may include limitations or restrictions for certain IMS content or services that limit or restrict the type, format, or quality of service that is authorized or recommended for use with the IMS-enabled device. For example, an electronic device with a small display screen may be limited with regard to an IMS video share service application. In some cases, a non-IMS-enabled electronic device may include features that would make it better suited for presenting IMS content or implementing IMS services if it were able to receive the IMS content or services.

SUMMARY

This disclosure relates to techniques, devices, and systems for using a mobile electronic device to provide multimedia content. In a first general aspect, a method of providing multimedia content includes receiving, at an Internet Protocol Multimedia Subsystem (IMS) enabled first electronic device, multimedia content from a content-providing electronic device via an IMS network, where the multimedia content has a first format. The method also includes converting, at the IMS-enabled first electronic device, the multimedia content from the first format to a second format that is different from the first format. The method further includes transmitting, from the IMS-enabled first electronic device to a second electronic device, the converted multimedia content in the second format, where the converted multimedia content is transmitted from the first electronic device to the second electronic device via a local network that is different from the IMS network.

In a second general aspect, a computer-readable storage medium includes instructions for causing one or more processors to receive, at an Internet Protocol Multimedia Subsystem (IMS) enabled first electronic device, multimedia content from a content-providing electronic device via an IMS network, where the multimedia content has a first format. The computer-readable storage medium also includes instructions for causing the one or more processors to convert, at the IMS-enabled first electronic device, the multimedia content from the first format to a second format that is different from the first format. The computer-readable storage medium further includes instructions for causing the one or more processors to transmit, from the IMS-enabled first electronic device to a second electronic device, the converted multimedia content in the second format, where the converted multimedia content is transmitted from the first electronic device to the second electronic device via a local network that is different from the IMS network.

In a third general aspect, an electronic device includes means for receiving, at an Internet Protocol Multimedia Subsystem (IMS) enabled first electronic device, multimedia content from a content-providing electronic device via an IMS network, where the multimedia content has a first format. The electronic device also includes means for converting, at the IMS-enabled first electronic device, the multimedia content from the first format to a second format that is different from the first format. The electronic device further includes means for transmitting, from the IMS-enabled first electronic device to a second electronic device, the converted multimedia content in the second format, where the converted multimedia content is transmitted from the first electronic device to the second electronic device via a local network that is different from the IMS network.

In a fourth general aspect, an electronic device includes one or more processors. The electronic device also includes a first interface operable to receive multimedia content from a content-providing electronic device via an IMS network, where the multimedia content has a first format. The electronic device further includes a conversion module operable by the one or more processors to convert the multimedia content from the first format to a second format that is different from the first format. The electronic device further includes a second interface operable to transmit, to a second electronic device, the converted multimedia content in the second format, where the converted multimedia content is transmitted to the second electronic device via a local network that is different from the IMS network.

Advantages may include one or more of the following. Hosting of IMS services or content distribution may be decentralized. IMS service may be extended to local networks, and may be extended to electronic devices that are not IMS-enabled. Transactions may be diverted to one or more local networks, which may ease congestion on an IMS network. An upgraded quality of service may be requested for an IMS service or IMS content. IMS content or services may be directed to a device that is better suited for a particular application or service.

The details of one or more aspects are set forth in the accompanying drawings and the description below. Other features, objects, and advantages will be apparent from the description and drawings, and from the claims.

DETAILED DESCRIPTION

This disclosure describes devices, systems, and techniques for using a mobile electronic device as a gateway device that can be used to provide IMS services or content to one or more other electronic devices. In various examples, the one or more other electronic devices may be configured to support IMS, or may not be configured to support IMS. The gateway device may be configured to support IMS and may have access to IMS content or services over an IMS network, and may provide the IMS content or services to the one or more other electronic devices over a local network, where the local network is not an IMS-based network. In this fashion, the gateway device may act as a server of IMS content or services to the one or more other electronic devices via a non-IMS-based network.

Examples of IMS services that the gateway device can provide to the one or more other electronic devices may include video sharing, video forwarding, peer-to-peer video sharing, video telephone, video conferencing, video snapshot, and general interoperability with other video call or video conferencing applications. Additional examples of IMS services that the gateway device can provide to the one or more other electronic devices may include multimedia messaging service (MMS), multimedia telephony (MMTel), text over IP, voice over IP, voice call continuity, push to talk, image sharing, wireless display, call forwarding, call transfer, screen sharing, chat-to-go, short message service (SMS), push to talk over cellular (PoC), push to see, interactive gaming, file sharing, instant messaging, voice messaging, voice telephony over IMS, IP television (IPTV), and content streaming services. The examples below will focus on a couple of IMS services, but it should be understood that the techniques, systems, and devices described herein may apply to any of the various IMS services or content.

By using the techniques disclosed herein, IMS server functionality may be decentralized. For example, a mobile electronic device may act as an IMS server, and may provide or make available IMS-based content or services to one or more other electronic devices that are not directly coupled-to or communicating with a centralized IMS server. This decentralization of IMS server functionality may permit IMS content and services to be extended, for example, to non-IMS-enabled devices that may otherwise be unable to access the IMS content or services. The decentralization may further permit an IMS terminal device to receive IMS content or services via a local, non-IMS-based, network. Moreover, IMS functionality may be made available to devices with more powerful computing or processing capabilities. IMS functionality may further be provided to devices with broader connectivity capabilities, which may further extend the reach of the IMS functionality in some examples.

Figure 1:
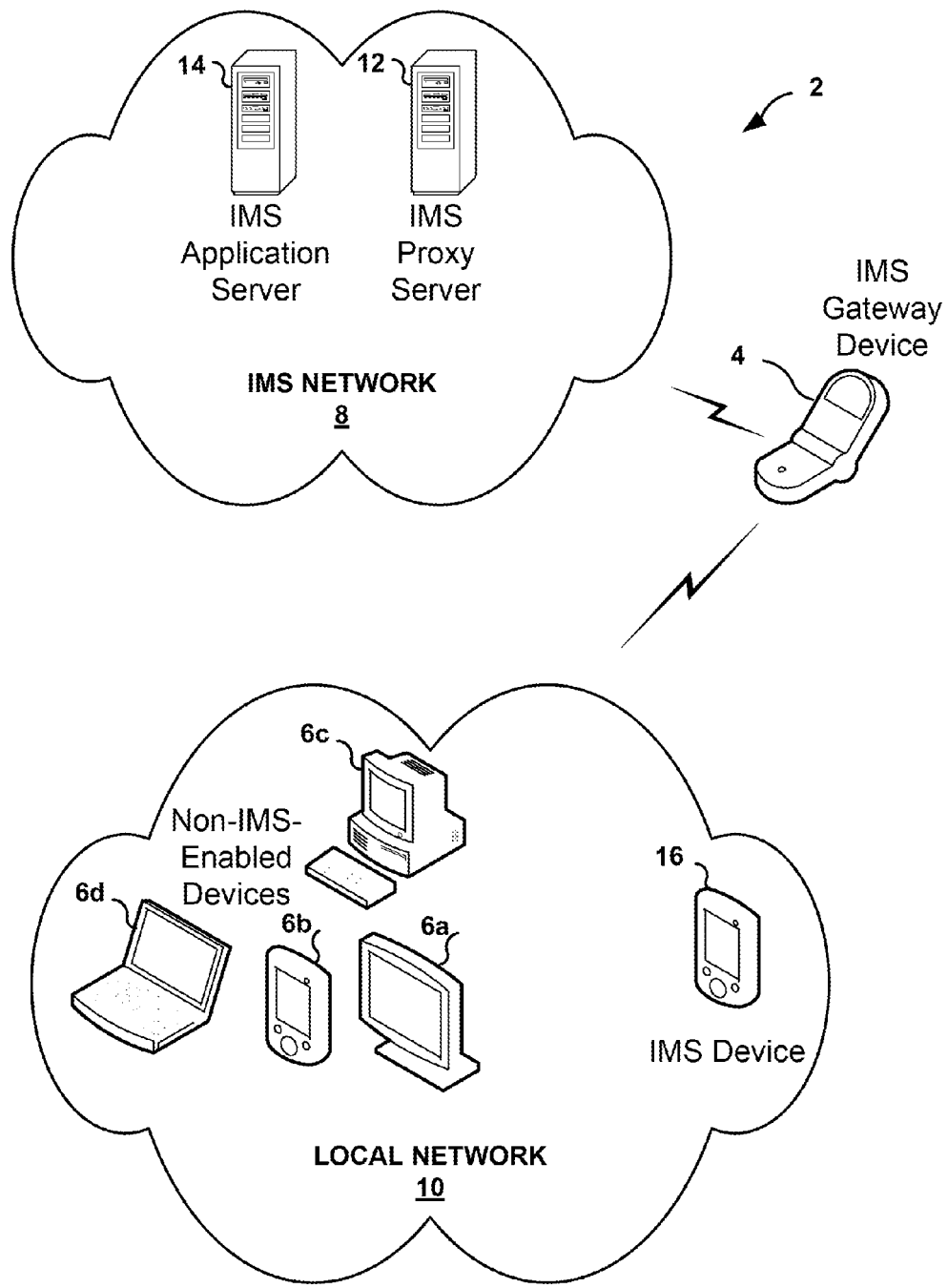
FIG. 1 is a block diagram of a system that includes an exemplary electronic device that can be used as a gateway device to provide IMS-based content or services to one or more other electronic devices.

FIG. 1 is a block diagram of a system 2 that includes an exemplary electronic device 4 that can be used as a gateway device to provide IMS-based content or services to one or more other electronic devices 6a-6d, 16. Electronic device 4 may be a computing device, and in some aspects may be a mobile computing device. In various examples, electronic device 4 may be a mobile phone, a smartphone, a landline phone, a personal digital assistant (PDA), a laptop or notebook computer, a pager, a wearable computing device, a television set-top box, a music player, a navigation device, or one or more processors implemented within an electronic device. In various examples, electronic device 4 is an IMS-enabled device.

Electronic device 4 may be communicably coupled to an IMS network 8. Electronic device 4 may communicate with an IMS proxy server 12 over IMS network 8. IMS proxy server 12 may be a computing device configured to communicate with an IMS-enabled device (e.g., electronic device 4) to establish one or more parameters for an IMS session. For example, electronic device 4 may contact IMS proxy server 12 via IMS network 8, and may provide information relating to a requested service or to requested IMS content. The proxy server may provide a list of available content or services in some examples; alternatively, device 4 may maintain a stored list of available content or services. In some examples, the device 4 may be used to view a menu of available content or services, and a selection may be made from the menu.

Electronic device 4 may request a particular IMS service or content in a communication to proxy server 12, and may provide one or more parameters to proxy server 12. Electronic device 4 may also provide an address to IMS proxy server 12, such as an electronic address to which the requested service or content should be provided. In some examples, the address may be an IP address for the electronic device 4. In other examples, the address may be an IP address for an electronic device different from electronic device 4 (e.g., one of devices 6a-6d or 16). In some examples, proxy server 12 may verify that the electronic device 4, or another device, is authorized to receive the requested IMS service or content. The proxy server 12 may authorize or authenticate electronic device 4, or another device, according to some examples. The IMS proxy server 12 may ensure that appropriate control signals are exchanged with electronic device 4, and that data packs are configured for a particular service to enable a specific application within the IMS framework.

Electronic device 4 may also communicate with an IMS application server 14 over IMS network 8. IMS application server 14 may be a computing device configured to communicate with an IMS-enabled device (e.g., electronic device 4), and may provide IMS content or IMS services to the IMS-enabled device. For example, IMS application server 14 may serve an application over IMS network 8 for execution at the electronic device 4. IMS application server 14 may be a content-providing device.

IMS proxy server 12 may communicate with IMS application server 14 over IMS network 8 or otherwise, and may provide IMS application server 14 with information associated with the service or content requested by the electronic device 4. IMS proxy server 12 may also provide IMS application server 14 with information associated with the requesting device 4, or with information associated with another electronic device. While IMS application server 14 and IMS proxy server 12 are shown separately in FIG. 1, in some examples a single computing device may provide the functionality of both application server 14 and proxy server 12. As will be discussed in more detail below, electronic device 4 may act as a mobile server of IMS content or services, and may provide some or all of the functionality of IMS proxy server 12, IMS application server 14, or both, to other electronic devices 6, 16 in various aspects. While device 4 is depicted as a mobile phone in FIG. 1, it is contemplated that any type of IMS-enabled electronic device may be used as an IMS gateway device in the manner discussed herein.

Electronic device 4 may also be communicably coupled to a local network 10. Local network 10 may be a Wi-Fi network in some examples, or may be any appropriate type of local IP network. Local network 10 may be a home network, an enterprise network, or an auto network, to list just a few examples, and may be different from IMS network 8. As such, electronic device 4 may be communicatively coupled with both IMS network 8 and local network 10. Electronic device 4 may communicate with a first device (e.g., IMS application server 14) via the IMS network 8, and may communicate with a second device (e.g., one or more of devices 6a-6d, 16) over local network 10.

Electronic device 4 may communicate with the one or more other electronic devices 6a-6d, 16 over the local network. Referring to the other electronic devices, device 16 may be an IMS-enabled device, and devices 6a-6d may not be IMS-enabled devices. In this example, devices 6a-6d are not configured to communicate according to an IMS protocol, or to directly receive IMS content or IMS services over IMS network 8 from IMS application server 14. In the depicted example, device 6a is a television or video monitor. In some examples, device 6a may be a wireless monitor. Device 6b is a handheld computing device, such as a personal digital assistant or a mobile phone. Device 6c is a desktop personal computer. Device 6d is a laptop personal computer. While only four illustrative examples of other non-IMS-enabled electronic devices 6a-6d are shown in FIG. 1, many other options may be used. Without limitation, additional examples of devices 6 that can communicate with gateway device 4 over local network 10 may include a mobile phone, a smartphone, a pager, a wearable computing device, a television set-top box, a navigation device, a music player, a game system, an electronic data storage device, a media server, or one or more processors implemented within an electronic device.

In various examples, electronic device 4 may provide access to IMS content or IMS services to the non-IMS-enabled devices 6a-6d via local network 10. In this fashion, electronic device 4 may serve as a "gateway" device for the non-IMS-enabled devices 6a-6d to the IMS-related content and services. The gateway device 4 may act as a server of IMS content and services to the one or more other electronic devices 6a-6d. In some aspects, the gateway device 4 may perform one or more of the functions typically associated with the IMS proxy server 12 or the IMS application server 14. For clarity, only a single local network 10 is shown in FIG. 1, but in other examples gateway device 4 may have access to two or more local networks, and may communicate with one or more other electronic devices over any of the local networks.

In some examples, an upgraded IMS quality of service or a content upgrade may be requested. In examples where the gateway device 4 is a mobile telephone, a mobile format may determine a maximum quality of service level that may be provided by the mobile phone. Some devices may be form-factor challenged. For example, the mobile phone gateway device 4 may be capable of rendering only VGA (video graphics array) quality video on a display screen of the mobile phone 4. However, device 6a may be a wireless high definition television (HDTV) monitor capable of displaying 1080i, 720p, or 1080p video resolution, which may represent a higher quality of service for a video application, such as an IMS video application, as compared to the VGA video that the phone 4 can display.

In some cases, the gateway device 4 may provide different qualities of service for a particular IMS service to different local devices 6. For example, for a particular service the gateway device 4 may provide a 64 kbps quality of service to device 6b, and a 2 Mbps quality of service to device 6c. Factors that can influence an appropriate quality of service for a particular device can include the device's processing capability, bandwidth considerations, connectivity considerations, physical size of a device component (e.g., display screen), control considerations (e.g., whether device includes a full keyboard, a reduced set of input buttons, or no input control capability), mobile formats, latency considerations, and the like.

Initially, suppose that a user is riding on a bus and watching streamed VOD (video on demand) content or an IPTV program on mobile phone gateway device 4. The video service may be provided by IMS application server 14, for example, over IMS network 8. Upon reaching her home, the user may wish to finish watching the streamed content or IPTV program on wireless HDTV monitor 6a, as watching the video content on the larger display may provide a better viewing experience than watching on the smaller screen of the mobile phone 4. Additionally, the user may prefer to view the content in high definition, which may not be an option on the mobile device 4 but which may be an option on the wireless HDTV monitor 6a.

The user may use the gateway device 4 to request a content upgrade, and the gateway device 4 may communicate via IMS network 8 with one or more of IMS proxy server 12 and IMS application server 14 to request the upgrade. In one example, the user selects "TV" from a list of devices (e.g., devices 6a-6d that may be communicatively coupled to the user's home network) and requests a content upgrade for her TV. In some examples, the gateway device 4 may authenticate device 6a (or any other device to be authenticated) for the requested service via local network 10, and may communicate the request to one or more of the IMS servers 12, 14. Alternatively, the gateway device 4 may provide information associated with the HDTV 6a to the IMS proxy server 12 via IMS network 8, and the proxy server 12 may authenticate the HDTV device 6a and communicate the authentication via IMS network 8. Examples of such information that may be communicated to the proxy server can include an IP address, a device identifier, a service identifier, a content identifier, an authentication code, an access code, connectivity information, priority information, subscription information, and service level information. In some examples, the HDTV device 6a (or any other device to be authenticated) may be verified against a same user profile in an IMS database.

In some examples, the gateway device may provide an IP address for the HDTV 6a to the IMS server(s), and the IMS application server 14 may directly send the upgraded data content to the HDTV 6a. In this example, control path communications may remain through IMS network 8 from application server 14 to gateway device 4, but data path communications may flow directly from the application server 14 to the HDTV 6a, bypassing the gateway device 4.

In other examples, the data path may continue to pass through the gateway device 4 (e.g., from the application server 14 to the gateway device 4 over IMS network 8, and to the HDTV 6a over local network 10) following the content upgrade. The gateway device 4 may terminate the control path, and data may be forwarded from the gateway device 4 to other devices 6 in the local network.

The user may then continue to view the video content on the wireless HDTV monitor 6a, which may display the upgraded video content received from the IMS application server 14 (whether through gateway device 4 or directly). As such, the video content (e.g., streamed VOD or IPTV program) that the user began viewing on mobile phone 4 in a first format (e.g., VGA) may be upgraded to a second format (e.g., 1080p resolution) for viewing on the wireless HDTV monitor 6a. The upgrade may be seamless from the user's point of view.

As another example of an IMS service that can be provided, consider that the user is at home and checking email on a smartphone device (e.g., gateway device 4). One of the emails may include an attachment, such as an attached document. The user may find it inconvenient to view the attachment on the smartphone display screen, and may prefer to view the attachment on a larger display screen. Similar to the aforementioned example, the user may use the smartphone device 4 to select wireless display monitor 6a (or laptop 6d, for example) and a wireless display service, and the gateway device 4 may arrange for the IMS wireless display service to be provided to the wireless display monitor 6a (or laptop 6d). This arrangement may include one or more of communications with the monitor 6a (or laptop 6d) over the local network 10, and communications with the IMS proxy server 12 or application server 14 over the IMS network 8. Authentication or verification of the monitor 6a (6d) may be performed.

When the service scheduling is completed, the attachment may be displayed on the wireless display monitor 6a, and the user may use the gateway device 4 to control display of the attachment on the wireless monitor 6a. For example, the user may control scrolling of the attachment using the gateway device 4, which may communicate commands to the wireless display 6a over the local network 10. Optionally, gateway device 4 may temporarily turn off its display to conserve battery power.

Referring again to FIG. 1, gateway device 4 may provide IMS content or services to IMS device 16, which may be a PDA in this example, over local network 10. That is, even though IMS device 16 may be configured to communicate with IMS servers 12, 14 over IMS network 8 to receive IMS content or services from central IMS servers, in some cases it may be desirable to push transactions to the local network 10. Similar to the examples described above with reference to the non-IMS-enabled devices 6, gateway device 4 may communicate with IMS device 16 (over local network 10), IMS servers 12, 14 (over IMS network 8), and arrange for IMS content to be provided to IMS device 16 via the gateway device 4. The IMS application server 14 may provide the content or services to gateway device 4 over IMS network 8, and the gateway device 4 may in turn provide the content or services to IMS device 16 over local network 10.

Suppose that gateway device 4 is providing IMS content or services to IMS device 16 over local network 10, as described above. IMS device 16 may additionally receive multimedia content or data via another connection from another electronic device. For example, IMS device 16 may receive content from device 6b via local network 10, or may receive content from an IMS device or server via IMS network 8. In this fashion, IMS device 16 may receive large amounts of data or content, where a portion of the data or content does not pass through gateway device 4. By bypassing gateway device 4 in this manner, power may be conserved at the gateway device 4. Similarly, in the earlier-described example where gateway device 4 provided IMS content or services to device 6d over local network 10, device 6d may additionally receive data or content from one or more other devices (e.g., device 6b, 6c, or 16) over local network 10 or another network.

In these and other examples, the data transfers, including those for additional data when appropriate, may occur for the same instance or session of the IMS service. As such, a user of the gateway device 4 or of a device receiving the IMS content or services via the gateway device 4 may be unaware of the nature of control and/or data communications that may be occurring between devices. For example, the user may be aware that data or services can be redirected via the gateway device 4, but may not appreciate the data or control paths that can be used to provide the content or service delivery. In this fashion, aspects of the redirection may be transparent to the user, and the user need not be concerned about such details in some examples.

Using the techniques described herein, device 4 may act as a mobile IMS server, and may extend IMS services to devices in a local environment. That is, IMS services may be extended "over the last mile," to devices that previously were unable to receive IMS services, or to IMS-enabled devices, which may ease loads on IMS network traffic. Quality of service may be managed over the last mile, and the techniques disclosed herein may enable transactions in the local communication loop rather than across the IMS network, for example. In various examples, the gateway device 4 may host application server programs and provide IMS content or services to devices in the local environment. The gateway device may also host IMS proxy server programs and authorize or authenticate devices in the local environment for service, or set-up and arrange for services to be provided (e.g., in concert with central IMS servers 12, 14). As such, the reach of IMS services that previously may have terminated at the edge of access networks may now be extended to reach local networks and devices communicating thereon.

In some cases, because IMS deployment and server functionality may be decentralized, third-party service or application development for mobile IMS gateway applications may be encouraged. In some examples, the gateway device 4 may perform media functions (e.g., as a media gateway (MGW) or a media resource function (MRF)). Media functions that may be performed include media processing, such as scaling, and frame interpolation or enhancement, depending on the quality of service appropriate for a particular device.

Figure 2:
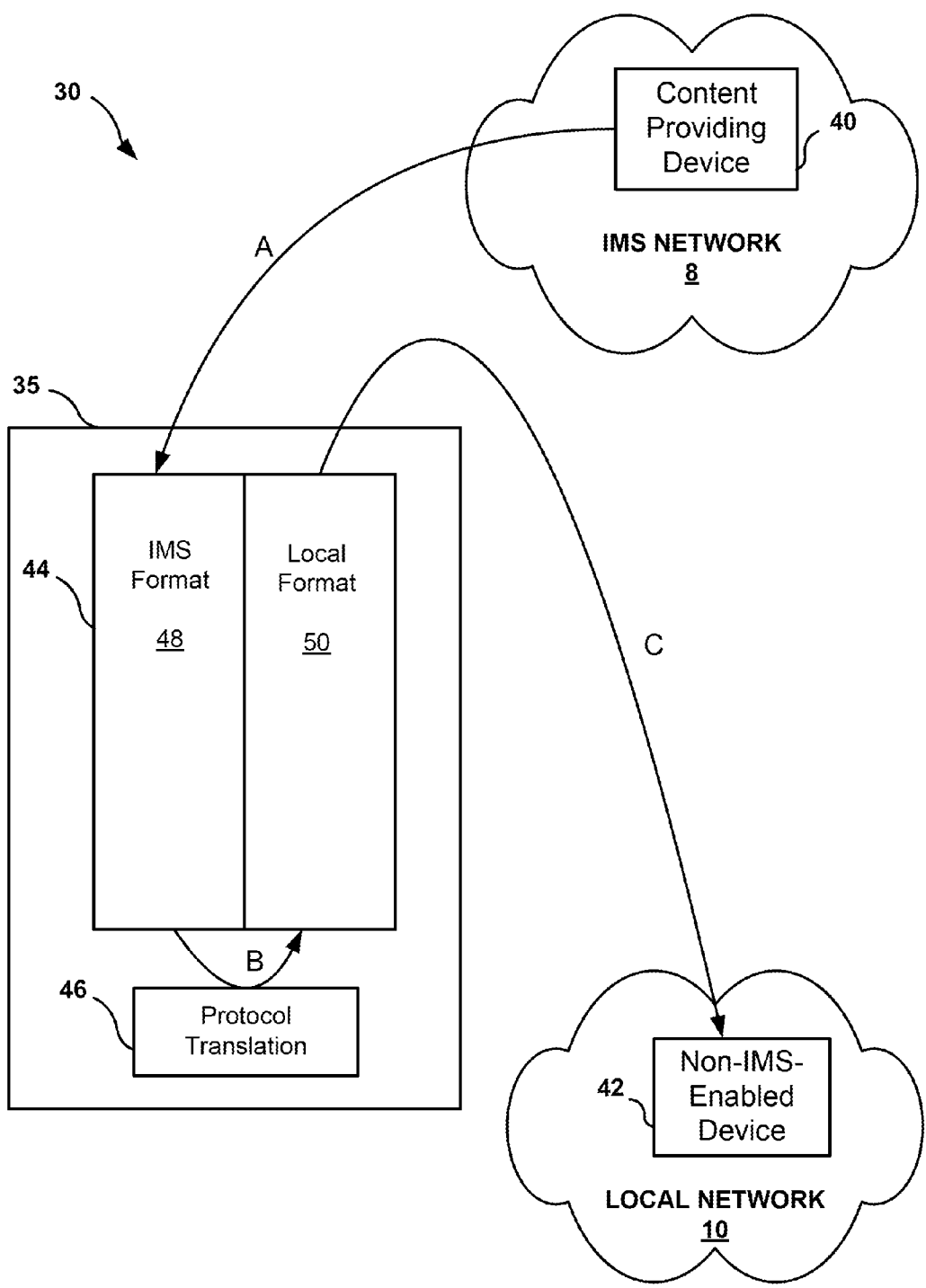
FIG. 2 is a block diagram of a system that includes an exemplary gateway device that can be used to provide interoperability between IMS and local formats.

FIG. 2 is a block diagram of a system 30 that includes an exemplary gateway device 35 that can be used to provide interoperability between IMS and local formats. The gateway device 35 may correspond to the electronic device 4 shown in FIG. 1, for example, and may be IMS-enabled. Gateway device 35 is communicably coupled to both the IMS network 8 and to the local network 10. A content providing device 40 is communicably coupled with IMS network 8, and is configured to provide IMS content or IMS services to an IMS-enabled device. In some examples, content providing device may correspond to IMS application server 14, or to a combination of IMS application server 14 and IMS proxy server 12 (see FIG. 1). A non-IMS-enabled device 42 is communicably coupled with local network 10, and is not directly communicably coupled with IMS network 8, or with IMS content-providing device 40. The gateway device 35 may communicate with the content providing device 40 over IMS network 8, and may communicate with the non-IMS-enabled device 42 over local network 10.

In various aspects, the gateway device 35 may implement a protocol translation between a first format and a second format. For example, the gateway device 35 may communicate with the content providing device 40 via IMS network 8 under a first protocol with data communicated in a first format, and may communicate with the non-IMS-enabled device 42 via local network 10 under a second protocol with data communicated in a second format. In some examples, the first protocol is an IMS protocol and the first format is an IMS format. The second protocol and second format may be associated with a local network, or with one or more electronic devices communicably coupled to the local network.

The gateway device 35 may include a collection 44 of one or more protocol stacks to facilitate communications with various electronic devices. The depicted example shows a representation of an IMS format protocol stack 48 and a generic local format protocol stack 50 in the collection 44 of protocol stacks. A protocol translation module 46 can translate data from a first format to a second format, as by a protocol translation. For clarity, only two protocol stacks 48, 50 are shown, but in other examples there may be three, four, five, six, or more protocol stacks (which may be based at least in part on a number of device types or network access types that the gateway device 35 supports) in the collection 44, and the protocol translation module 46 may translate data between any two such protocols or formats. For example, the device 35 may include DLNA (Digital Learning Network Alliance) and/or FLO (Forward Link Only) protocol stacks, and may convert from an IMS format to one of these local formats.

In an example, gateway device 35 requests IMS content (or services) from content providing device 40, and content providing device 40 sends the IMS content to gateway device 35 over IMS network 8 (see arrow "A"). The IMS content is in an IMS format, and the gateway device 35 receives the IMS content using the IMS format protocol stack 48. The protocol translation module 46 then converts the received data from the IMS format to a local format by performing a protocol translation (see arrow "B"), so that the data is formatted according to the local format protocol stack 50. The gateway device 35 then transmits the content, now in the local format, to the non-IMS-enabled device 42 via local network 10 (see arrow "C").

The gateway device 35, which is an IMS-enabled electronic device, receives multimedia content from the content-providing electronic device 40 over the IMS network 8. The multimedia content has a first format (an IMS format in this example). The gateway device 35 converts the multimedia content from the first format to a second format that is different from the first format. In this example, the second format is a local format that is different from the IMS format. The gateway device 35 transmits the converted multimedia content in the second format to the non-IMS-enabled device 42 over the local network 10, where the local network 10 is different from the IMS network 8.

The example above highlights one example of a format conversion that may be performed by the gateway device 4. As another example, a quality of service format conversion may be performed by the gateway device 4. With reference to the aforementioned example involving the video content upgrade from VGA video to HD video, gateway device 4 may host an application program to implement the content upgrade format conversion.

One example of a local format that gateway device 35 can convert received IMS content or services to is the DLNA format. For example, local format protocol stack 50 may be a DLNA protocol stack, and protocol translation module 46 may translate data from an IMS format to a DLNA format using the IMS protocol stack 48 and the DLNA protocol stack. Non-IMS-enabled device 42 may be a DLNA device. Examples of DLNA devices can include digital media servers (DMS), digital media players (DMP), digital media controllers (DMC), and digital media renderers (DMR).

Figure 3:
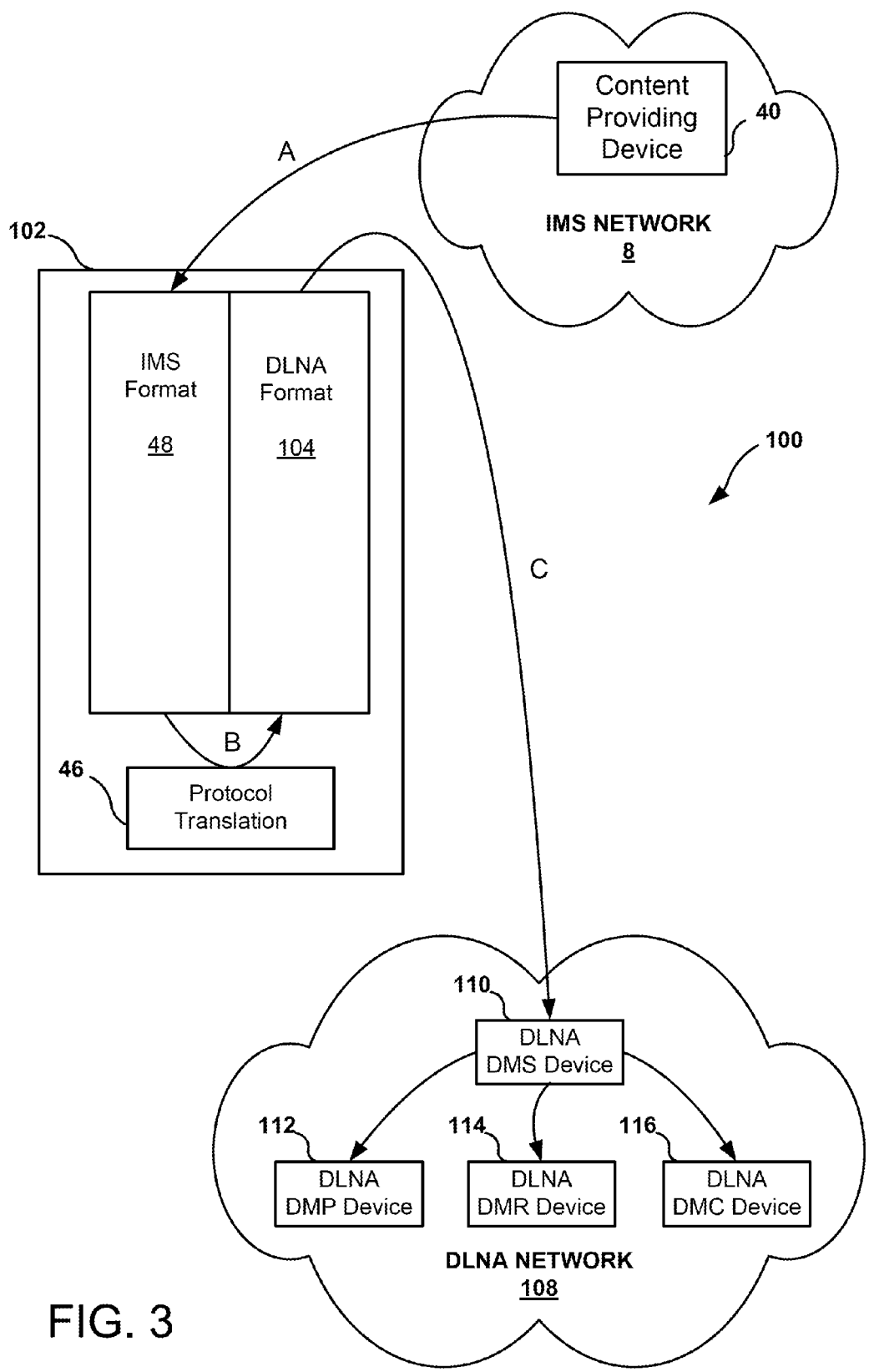
FIG. 3 is a block diagram of a system that includes an exemplary gateway device that can be used to provide interoperability between IMS and DLNA formats.

FIG. 3 is a block diagram of a system 100 that includes an exemplary gateway device 102 that can be used to provide interoperability between IMS and DLNA formats. The gateway device 102 includes an IMS format protocol stack 48, a DLNA format protocol stack 104, and a protocol translation module 46 that can convert between the IMS and DLNA formats (or between any other formats supported by the gateway device 102) using the IMS and DLNA protocol stacks 48, 104. The gateway device 102 can receive IMS content from IMS content-providing device 40 via IMS network 8. The gateway device is also communicably coupled with a DLNA network 108. As such, gateway device 102 may be communicatively coupled with both IMS network 8 and DLNA network 108, and may communicate with a first device (e.g., content providing device 40) via the IMS network 8, and may communicate with one or more other electronic devices over the DLNA network 108.

As shown in FIG. 3, a DLNA DMS device 110 is in communication with a DLNA DMP device 112, a DLNA DMR device 114, and a DLNA DMC device 116 via the DLNA network 108. Each of devices 110, 112, 114, and 116 are configured for DLNA, and communicate with one another over DLNA network 108 using the DLNA protocol. DLNA DMS device 110 may be an electronic device that can store content and make it available to DLNA DMP devices (e.g., device 112) or DLNA DMR devices (e.g., device 114). DMS device 110 may be a computer, for example, and may include or have access to a storage device for storing multimedia content. As one example, DLNA DMP device 112 may be a digital versatile disc (DVD) player. DLNA DMR device 114 may be a television or video monitor, for example.

In an example, gateway device 102 requests IMS content (or services) from IMS content providing device 40, and content providing device 40 sends the IMS content to gateway device 102 over IMS network 8 (see arrow "A"). The IMS content is in an IMS format, and the gateway device 102 receives the IMS content using the IMS format protocol stack 48. The protocol translation module 46 then converts the received data from the IMS format to DLNA format by performing a protocol translation (see arrow "B"), so that the data is formatted according to the DLNA format protocol stack 104.

The gateway device 102 then transmits the content, now in DLNA format, to the DLNA DMS device 110 via DLNA network 108 (see arrow "C"). The DMS device 110 receives the content from the gateway device 102, and may store the content or may transmit the content, for example, to DMP device 112, DMR device 114, or DMC device 116. As such, for example, DMP device 112 may receive IMS-based content or services via the gateway device 102, where the gateway device 102 implements a format change that makes the IMS content or services accessible to the non-IMS-enabled DLNA device 112. In alternative examples, the gateway device 102 may send the converted content in DLNA format directly to the DMP device 112, the DMR device 114, or the DMC device 116, without first sending the content to the DMS device 110.

In the example of FIG. 3, gateway device 102 extends IMS service to device 110 in a local environment defined by the (local) DLNA network 108. Device 110 may or may not be IMS-enabled in various examples. Device 110 then forwards the IMS content or services to other devices 112, 114, 116 in the local environment via the local (DLNA) network 108.

Figure 4:
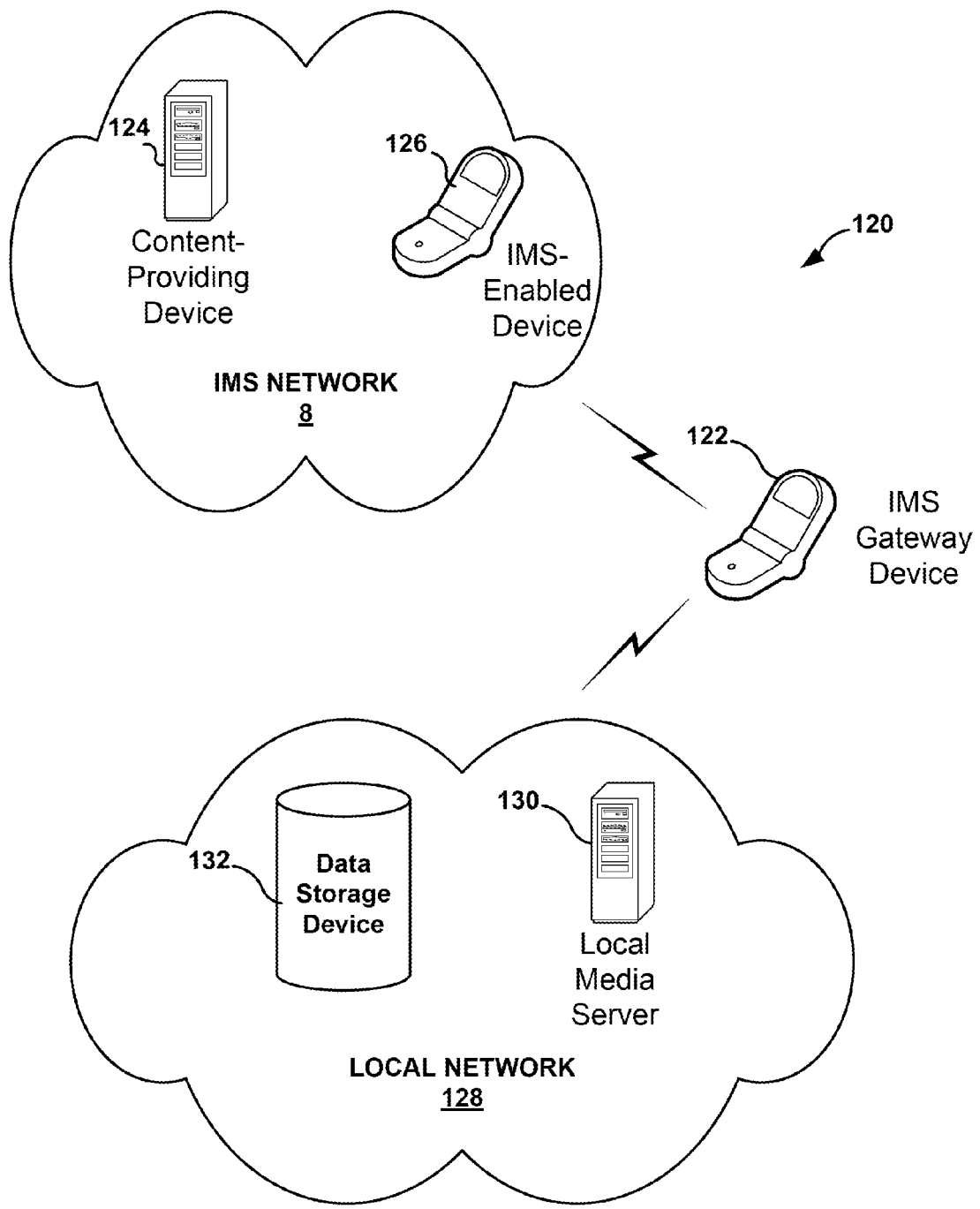
FIG. 4 is a block diagram of a system that includes an exemplary gateway device that can be used to supplement an IMS session involving IMS-enabled devices with content received over a non-IMS network from a non-IMS-enabled device.

FIG. 4 is a block diagram of a system 120 that includes an exemplary gateway device 122 that can be used to supplement an IMS session involving IMS-enabled devices with content received over a non-IMS network from a non-IMS-enabled device. IMS-enabled gateway device 122 may communicate with IMS content-providing device 124 via IMS network 8, and IMS content-providing device 124 may provide IMS content or services to gateway device 122, in a fashion similar to the examples described above. A second IMS-enabled electronic device 126 may similarly be communicably coupled with IMS network 8, and may be configured to use or receive IMS services or content via IMS network 8.

IMS gateway device 122 may also be communicatively coupled with a local network 128, which may be different from IMS network 8. Local network 128 may be a home or enterprise network, for example. A local media server 130 and a data storage device 132 may each be communicably coupled with the local network 128, and IMS gateway device 122 may communicate with the local server 130 or the storage device 132 over the local network 128. In one non-limiting example, local network 128 is a DLNA network, and local server 130 and storage device 132 are DLNA-certified devices.

The IMS gateway device 122 can supplement an IMS session by accessing content available via the local network 128 but not available via the IMS network 8. Assume that IMS content-providing device 124 can provide a variety of IMS-based services, including a packet switched video telephony (PSVT) service and a video share service, to IMS-enabled devices (e.g., devices 122, 126). A first user of the gateway device 122 may be participating in a PSVT call over IMS network 8 with a second user of IMS-enabled device 126, and may wish to share a video clip stored on local media server 130 with the second user.

The first user may use the gateway device 122 to communicate with the media server 130 over the local network 128, select the media server 130, and select the video clip (e.g., by browsing folders of content stored at the media server 130 and selecting the clip). The first user may then use gateway device 122 to send the video clip to the second device 126 over IMS network 8 using the IMS video share service so that the second user can view the video clip.

Figure 5:
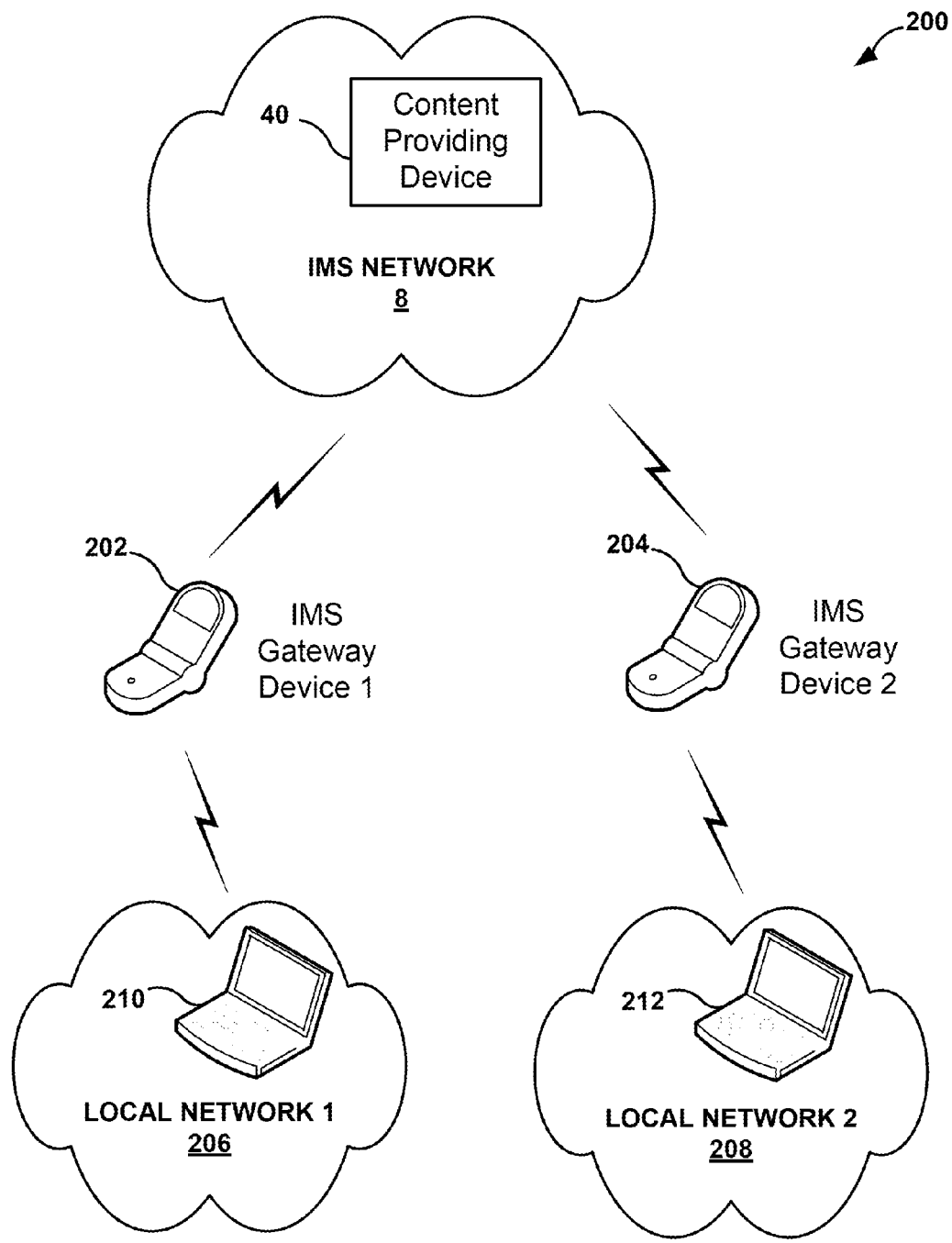
FIG. 5 is a block diagram of a system that includes exemplary first and second gateway devices that are communicably coupled to an IMS network, and that are separately individually communicably coupled, respectively, to a first local network and a second local network.

FIG. 5 is a block diagram of a system 150 that includes exemplary first and second gateway devices 202, 204 that are communicably coupled to an IMS network 8, and that are separately individually communicably coupled, respectively, to a first local network 206 and a second local network 208. In some aspects, an IMS gateway device may provide or make available IMS content or services to one or more other electronic devices across two or more networks. The first gateway device 202 and the second gateway device 204 may each be IMS-enabled devices, and may each communicate with IMS proxy or application servers via IMS network 8, in similar fashion as described above with reference to gateway device 4 of FIG. 1.

The first gateway device 202 may act as a mobile IMS server, and may extend IMS service to electronic device 210, which may be a laptop computer in this example, via local network 206. The second gateway device 204 may also act as a mobile IMS server, and may extend IMS service to electronic device 212, which may be a laptop computer in this example, via local network 208.

In various examples, gateway device 202 and gateway device 204 may be considered peers, as each is acting as a mobile server of IMS content or services to one or more other electronic devices 210, 212 over one or more local networks 206, 208. The gateway peers 202, 204 may communicate with one another in various aspects, which may permit bridging local networks 206, 208 together. For example, gateway device 202 and gateway device 204 may communicate over IMS network 8, and gateway device 204 may provide data (e.g., a video clip) received from device 212 over local network 208 to gateway device 202. As another example, gateway device 202 may provide data (e.g., a video clip) received from device 210 over local network 206 to gateway device 204 via IMS network 8.

Figure 6:
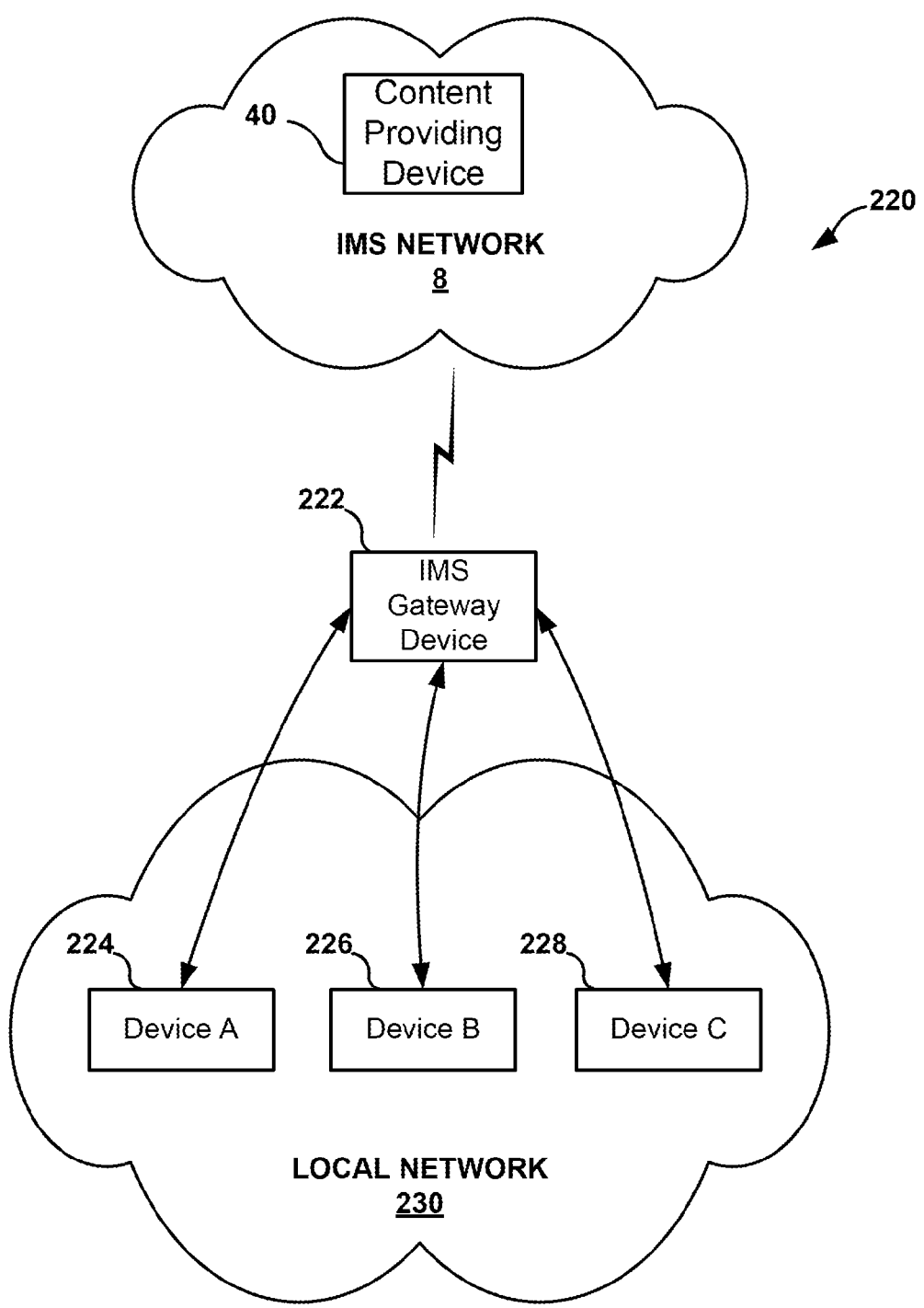
FIG. 6 is a block diagram of a system that includes an exemplary gateway device that can be used to extend IMS service to one or more electronic devices in a local environment.

FIG. 6 is a block diagram of a system 220 that includes an exemplary gateway device 222 that can be used to extend IMS service to one or more electronic devices 224, 226, 228 in a local environment. IMS gateway device 222 is IMS-enabled, and may communicate with IMS content-providing device 40 over IMS network 8 as described above. Gateway device 22 is also communicatively coupled with local network 230, which may be a home network in this example. Each of gateway device 222, device A 224, device B 226, and device C 228 may be mobile phones in this example.

A user may use IMS gateway device 222 in an IMS video telephone call with another IMS-enabled device (not shown). Phones 224, 226, and 228 may each join the video phone call, and may do so by communicating with gateway device 222 over the local network 230. In some examples, gateway device 222 may first communicate with each of devices 224, 226, and 228 and may obtain information regarding desired service or content or regarding information for the particular device. Device 222 may then communicate with one or more central IMS servers, such as content providing device 40 (which may also include proxy server functionality) in this example. Alternatively, gateway device 222 may store information associated with devices 224, 226, and 228 in a memory device, and may omit the step of acquiring the information from the devices 224, 226, 228. The gateway device may arrange for the IMS service to be extended to the devices 224, 226, 228, as by communicating with content-providing device 40, and the devices 224, 226, 228 may be invited to join the call (over local network 230). The gateway device 222 may route data over local network 230 to the devices 224, 226, 228.

As another example, in a business environment context, devices 224, 226, 228 may represent various electronic devices in a conference room, and may communicate with one another over local network 230 (communications among local devices not shown in FIG. 6). Gateway device 222, may act as a mobile IMS gateway to make IMS content or services available to the devices 224, 226, 228, as described above.

Figure 7:
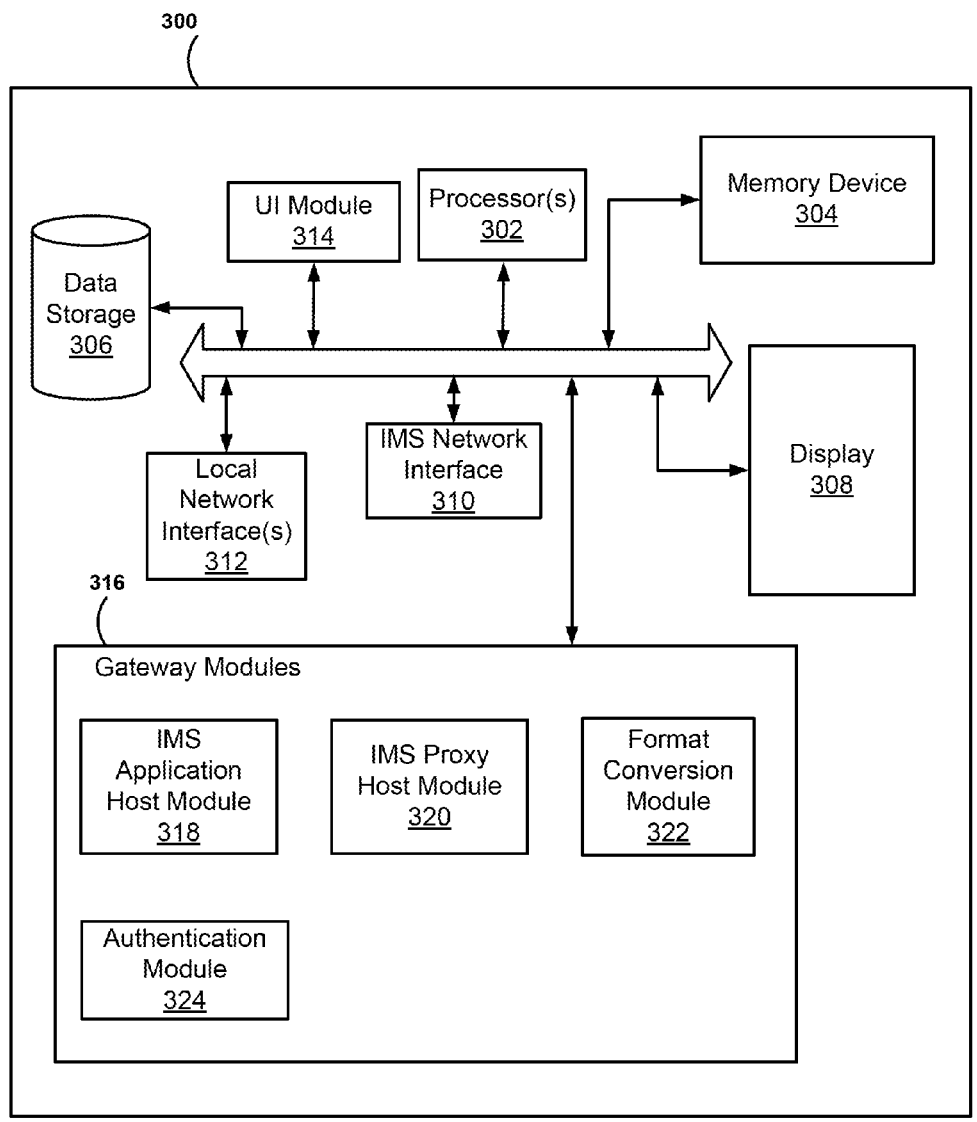
FIG. 7 is a block diagram of an exemplary electronic device that can be used as a gateway device to provide mobile IMS server functionality.

FIG. 7 is a block diagram of an exemplary electronic device 300 that can be used as a gateway device to provide mobile IMS server functionality. Device 300 may correspond to any of devices 4, 35, 102, 122, 202, 204, or 222, for example. Device 300 includes one or more processors 302, a memory device 304, and a data storage device 306. The discussion that follows will assume one processor 302, but some examples may include two or more processors. The processor 302 may implement functionality and/or execute instructions to perform methods, processes, or techniques discussed herein.

The processor 302 may be a microprocessor, a microcontroller, a digital signal processor (DSP), or one or more instantiated cores of an application specific integrated circuit (ASIC) or a programmable logic device, such as a field programmable gate array (FPGA), to list just a few examples. In some examples, memory device 304 may be a volatile memory device, and in other examples may be a non-volatile memory device. Data storage 306 may provide non-volatile storage for firmware, software, host application files, host proxy files, interface data or parameters for IMS networks or devices, interface data or parameters for local networks or devices, access data or parameters, or other data or parameters that may be used to implement the techniques discussed herein.

In some examples, software, firmware, or code comprising instructions or data may be loaded from data storage 306 to memory device 304, and may be executed or operated on by processor 302. In some examples, processor 302 may include on-chip memory, such as a cache, into which instructions or data may be loaded and operated upon.

A display 308 may be used to display information that may be viewed by a user. For example, the display 308 may be used to display IMS content or information related to IMS services, or to display information related to one or more local networks or one or more devices accessible via the one or more local networks. In various examples, display 308 may also be used for receipt of user interface input from a user.

An IMS network interface 310 can be used, for example, to communicably couple electronic device 300 with other IMS-enabled electronic devices (e.g., proxy server 12, application server 14, content-providing device 40, and device 126) over an IMS network, such as network 8. IMS Network interface 310 may include a transmitter and a receiver, and may include one or more interface ports to provide interface connectivity with other devices. IMS interface 310 may support wired or wireless communication.

A local network interface 312 (or multiple local network interfaces) can be used, for example, to communicably couple electronic device 300 with other electronic devices (e.g., devices 6a-6d, 16, 42, 112, 114, 116, 130, 132, 210, 212, 224, 226, 228) over a local network, such as any of networks 10, 108, 128, 206, 208, or 230. Local network interface 312 may include a transmitter and a receiver, and may include one or more interface ports to provide interface connectivity with other devices. Local interface 312 may support wired or wireless communication. In some examples, IMS interface 310 and local interface(s) 312 may share one or more components, such as hardware or software associated with transmit and receive functionality.

A UI module 314 may be used to implement a user interface. For example, the UI module 314 may receive input signals from one or more input devices. Examples of input devices may include one or more input buttons, a keyboard, a touch screen, a microphone, etc., and the UI module 314 may interpret signals received from the input devices. In some cases, UI module 314 may receive input that specifies an IMS service or IMS content, or that specifies another electronic device or non-IMS content.

Device 300 also includes a group of gateway modules 316, including an IMS server application host module 318, an IMS server proxy host module 320, a format conversion module 322, and an authentication module 324. IMS proxy host module 320 can be used to provide some or all of the functionality of a centralized IMS proxy server, such as proxy server 12 (see FIG. 1), on the mobile electronic device 300. For example, an IMS session may be scheduled and arranged within the IMS framework. Control and data signals between electronic devices may be managed, in some examples. Authentication or verification of devices requesting or targeted for receipt of IMS content or services may be performed. In various examples, authentication or verification may be performed using the IMS network or the local network. Available IMS services or content may be presented on display 310, and a selection of a service or content may be received. In some cases, IMS proxy host module 320 may communicate with a central IMS proxy server (e.g., server 12) over an IMS network to provide IMS framework management functions.

IMS server application host module 318 can be used to provide some or all of the functionality of a centralized IMS application server, such as application server 14 (see FIG. 1), on the mobile electronic device 300. In some cases, IMS application host module 318 may communicate with a central IMS application server (e.g., server 14) over an IMS network to provide IMS services or content. IMS server application host module 318 may work in concert with IMS server proxy host module 320.

Authentication module 324 can be used to verify that an electronic device is authorized for a particular IMS service or IMS content. This may involve, for example, determining that the device is capable of rendering an IMS service at a particular quality of service. Authentication module 324 may determine whether a device coupled to a local network should be permitted access to particular content (e.g., television content, web content, a particular type of television content or web content). In some cases, authentication module 324 can direct communications with a device via the local network to ascertain whether authentication is proper. In some examples, authentication module may communicate with an IMS server over the IMS network to authenticate a device, which may include accessing a same user profile that may be stored in an IMS database, for example. User profiles may also be stored locally on the gateway device in some examples.

Format conversion module 322 can be used to convert received multimedia content from a first format to a second format. In some examples, the first format may be an IMS format. The second format may be associated with a local network, such as a local home, enterprise, or auto network. Examples of such networks may include DLNA or FLO networks. In some examples, the first format may be a first quality of service and the second format may be a second quality of service, where the second quality of service may represent an upgrade or a downgrade in quality as compared to the first quality of service.

Figure 8:
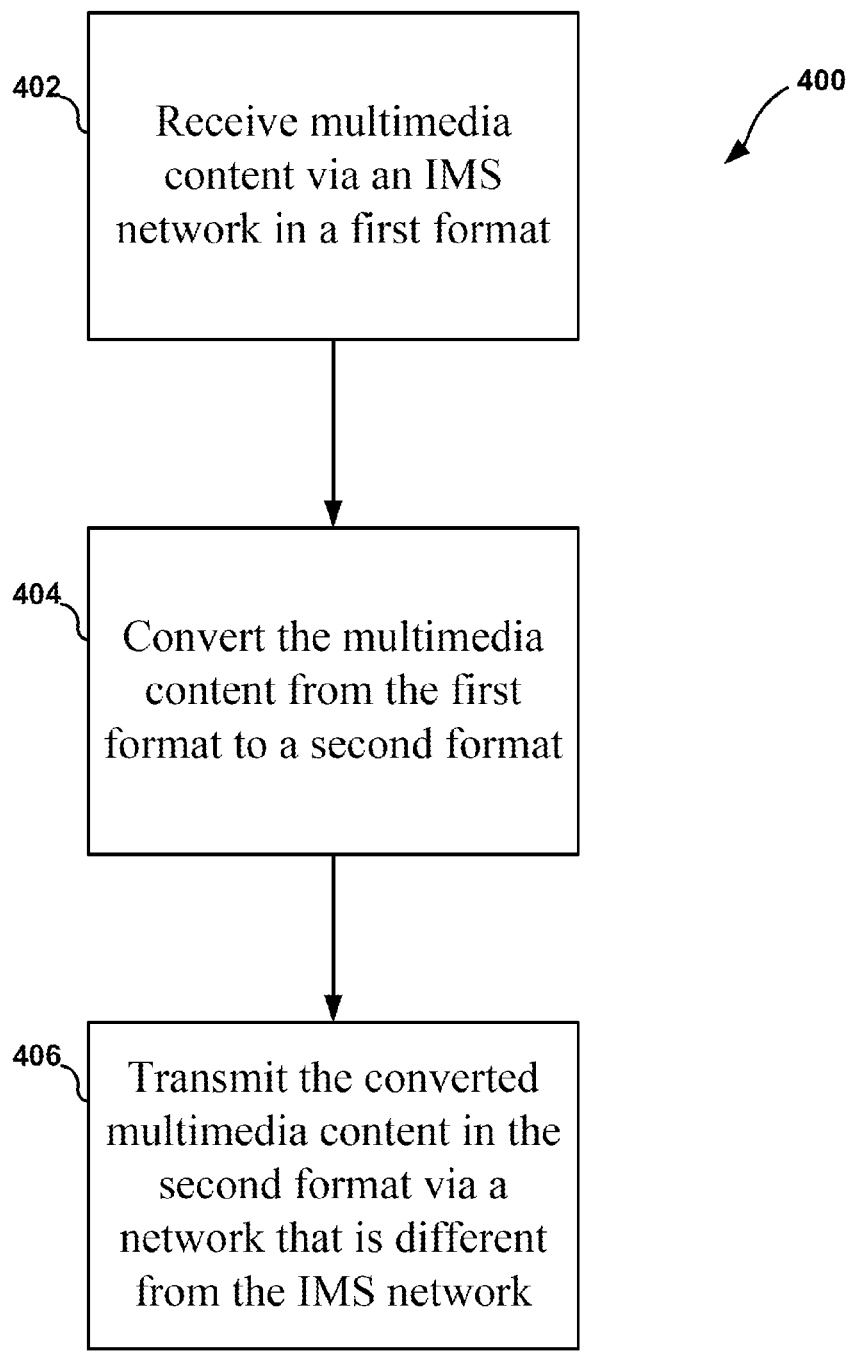
FIG. 8 is a flow diagram illustrating an example of a method that may be performed by an electronic device to provide distributed IMS server functionality.

FIG. 8 is a flow diagram illustrating an example of a method 400 that may be performed by an electronic device to provide distributed IMS server functionality. For example, the method 400 may be performed by any of devices 4, 35, 102, 122, 202, 204, 222, or 300.

Multimedia content is received via an IMS network in a first format (402). The multimedia content is received at an IMS-enabled first electronic device, and is received from a content-providing electronic device via the IMS network. The content-providing device may be an IMS application server. The IMS-enabled first electronic device may be configured to communicate via the IMS network with other IMS-enabled electronic devices. The IMS-enabled first electronic device may be configured to receive IMS content or IMS services via the IMS network. The received multimedia content may have a first format.

The received multimedia content may be converted from the first format to a second format (404). The second format may be different from the first format. In some examples, the conversion may involve implementing a protocol translation to convert the content from the first format to the second format. The second format may be associated with the local network. The protocol translation may be a translation from an IMS format to a DLNA format. In some examples, the conversion may involve upgrading a quality of service associated with the multimedia content.

The converted multimedia content is transmitted in the second format via a network that is different from the IMS network (406). The converted multimedia content in the second format may be transmitted from the IMS-enabled first electronic device to a second electronic device over a local network. The second electronic device may not be IMS-enabled. That is, the second device may not be configured to receive communications over the IMS network.

In examples where the conversion includes a quality of service upgrade, the second electronic device may be configured to support the upgraded quality of service and the first electronic device may not be configured to support the upgraded quality of service. The second electronic device may be authenticated prior to transmitting the converted multimedia content to the second electronic device. The authentication may be based on a same user profile, for example, and may be carried out via the IMS network (and possibly by accessing information stored in an IMS database), or via the local network.

In some examples, additional multimedia content may be received via the first local network from another electronic device, and may be transmitted to an IMS-enabled electronic device via the IMS network. In some examples, the converted multimedia content may be presented on the second electronic device and, while the content is being presented on the second device, an input that indicates adjusting the presentation of the converted multimedia on the second device may be received. A command to adjust presentation of the converted multimedia content may be transmitted from the first electronic device to the second electronic device via the first local network. The command may be transmitted responsive to the received input.

In some examples, the multimedia content may be converted from the first format to a third format that is different from the first format and the second format. The converted multimedia content in the third format may be transmitted to a third electronic device, where the converted multimedia content is transmitted from the first electronic device to the third electronic device via the first local network, and wherein the second and third formats are associated with different qualities of service.

In some examples, additional content having the first format may be received at the first electronic device, may be converted to a third format that is different from the first format, and may be transmitted to a third electronic device via a second local network. The second local network may be different from the IMS network and the first local network.

The techniques described in this disclosure may be implemented within one or more of a general purpose microprocessor, digital signal processor (DSP), application specific integrated circuit (ASIC), field programmable gate array (FPGA), programmable logic device (PLD), or other equivalent logic devices. Accordingly, the terms "processor" or "controller," as used herein, may refer to any one or more of the foregoing structures or any other structure suitable for example of the techniques described herein.

The various components illustrated herein may be realized by any suitable combination of hardware, software, or firmware. In the figures, various components are depicted as separate units or modules. However, all or several of the various components described with reference to these figures may be integrated into combined units or modules within common hardware, firmware, and/or software. Accordingly, the representation of features as components, units or modules is intended to highlight particular functional features for ease of illustration, and does not necessarily require realization of such features by separate hardware, firmware, or software components. In some cases, various units may be implemented as programmable processes performed by one or more processors.

Any features described herein as modules, devices, or components may be implemented together in an integrated logic device or separately as discrete but interoperable logic devices. In various aspects, such components may be formed at least in part as one or more integrated circuit devices, which may be referred to collectively as an integrated circuit device, such as an integrated circuit chip or chipset. Such circuitry may be provided in a single integrated circuit chip device or in multiple, interoperable integrated circuit chip devices, and may be used in any of a variety of image, display, audio, or other multi-multimedia applications and devices. In some aspects, for example, such components may form part of a mobile device, such as a wireless communication device handset (e.g., a mobile telephone handset).

If implemented in software, the techniques may be realized at least in part by a computer-readable data storage medium comprising code with instructions that, when executed by one or more processors, performs one or more of the methods described above. The computer-readable storage medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), embedded dynamic random access memory (eDRAM), static random access memory (SRAM), flash memory, magnetic or optical data storage media. Any software that is utilized may be executed by one or more processors, such as one or more DSP's, general purpose microprocessors, ASIC's, FPGA's, or other equivalent integrated or discrete logic circuitry.

Various aspects have been described in this disclosure. These and other aspects are within the scope of the following claims.

What is claimed is:
1. A method of providing multimedia content, comprising:
receiving, at an Internet Protocol Multimedia Subsystem (IMS) enabled first electronic device comprising a mobile device, multimedia content from a content-providing electronic device via an IMS network, the multimedia content having a first format;
converting, at the IMS-enabled first electronic device, the multimedia content from the first format to a second format that is different from the first format;
authenticating, at the IMS-enabled first electronic device, a second electronic device prior to transmitting the converted multimedia content from the IMS-enabled first electronic device to the second electronic device;
transmitting, from the IMS-enabled first electronic device to the authenticated second electronic device, the converted multimedia content being in the second format, wherein the converted multimedia content is transmitted from the IMS-enabled first electronic device to the second electronic device via a local network that is different from the IMS network, and the converted multimedia content is presented on the second electronic device;
receiving, at the IMS-enabled first electronic device while the converted multimedia content is being presented on the second electronic device, an input that indicates adjusting a presentation of the converted multimedia content on the second electronic device; and
transmitting, from the IMS-enabled first electronic device to the second electronic device via the local network, a command to adjust the presentation of the converted multimedia content responsive to the receipt of the input.

2. The method of claim 1, wherein the second electronic device is not configured to receive communications via the IMS network.

3. The method of claim 1, wherein converting the multimedia content from the first format to the second format is based on a protocol translation.

4. The method of claim 3, wherein the protocol translation is a translation from an IMS format to a Digital Living Network Alliance (DLNA) format.

5. The method of claim 1, wherein converting the multimedia content from the first format to the second format comprises upgrading a quality of service associated with the multimedia content.

6. The method of claim 5, wherein the second electronic device is configured to support the upgraded quality of service, and wherein the IMS-enabled first electronic device is not configured to support the upgraded quality of service.

7. The method of claim 6, further comprising:
determining a maximum quality of service level of the multimedia content provided by the IMS-enabled first electronic device;
determining a quality of service of the multimedia content for each of a plurality of electronic devices connected with the local network; and
requesting an appropriate quality of service of the multimedia content for one of the plurality of electronic devices upon detecting the appropriate quality of service of the multimedia content exceeding the maximum quality of service level provided by the IMS-enabled first electronic device.

8. The method of claim 1, wherein the local network comprises a first local network, and wherein the method further comprises:
receiving, at the IMS enabled first electronic device, additional multimedia content having the first format via the IMS network;
converting, at the IMS-enabled first electronic device, the additional multimedia content from the first format to a third format that is different from the first format; and
transmitting, from the IMS-enabled first electronic device to a third electronic device, the converted additional multimedia content in the third format, wherein the converted additional multimedia content is transmitted from the IMS-enabled first electronic device to the third electronic device via a second local network that is different from the IMS network and is different from the first local network.

9. The method of claim 1, further comprising:
receiving additional multimedia content at the IMS-enabled first electronic device via the local network from a third electronic device; and
transmitting the additional multimedia content to an IMS-enabled electronic device via the IMS network.

10. The method of claim 1, wherein additional multimedia content is received at the second electronic device from a third electronic device via the local network.

11. The method of claim 1, wherein additional multimedia content is received at the second electronic device from a third electronic device via the IMS network.

12. The method of claim 1, further comprising:
converting, at the IMS-enabled first electronic device, the multimedia content from the first format to a third format that is different from the first format and the second format; and
transmitting, from the IMS-enabled first electronic device to a third electronic device, the converted multimedia content in the third format, wherein the converted multimedia content is transmitted from the IMS-enabled first electronic device to the third electronic device via the local network, and wherein the second and third formats are associated with different qualities of service.

13. The method of claim 1, wherein the receiving, at the IMS-enabled first electronic device, multimedia content comprises:
receiving a menu of multimedia content available through the IMS network, wherein the menu is received from an IMS proxy server;
displaying the menu of the available multimedia content; and
receiving a user input identifying a selection from the displayed menu of the available multimedia content.

14. The method of claim 1, wherein the authenticating comprises accessing user profiles stored on the IMS-enabled first electronic device to authenticate the second electronic device for receiving the converted multimedia content.

15. A non-transitory computer-readable storage medium comprising instructions for causing one or more processors to:
receive, at an Internet Protocol Multimedia Subsystem (IMS) enabled first electronic device comprising a mobile device, multimedia content from a content-providing electronic device via an IMS network, the multimedia content having a first format;
convert, at the IMS-enabled first electronic device, the multimedia content from the first format to a second format that is different from the first format;
authenticate, at the IMS-enabled first electronic device, a second electronic device prior to transmitting the converted multimedia content from the IMS-enabled first electronic device to the second electronic device;
transmit, from the IMS-enabled first electronic device to the authenticated second electronic device, the converted multimedia content being in the second format, wherein the converted multimedia content is transmitted from the IMS-enabled first electronic device to the second electronic device via a local network that is different from the IMS network, and the converted multimedia content is presented on the second electronic device;
receive, at the IMS-enabled first electronic device while the converted multimedia content is being presented on the second electronic device, an input that indicates adjusting a presentation of the converted multimedia content on the second electronic device; and
transmit, from the IMS-enabled first electronic device to the second electronic device via the local network, a command to adjust the presentation of the converted multimedia content responsive to the receipt of the input.

16. The computer-readable storage medium of claim 15, wherein the second electronic device is not configured to receive communications via the IMS network.

17. The computer-readable storage medium of claim 15, wherein converting the multimedia content from the first format to the second format is based on a protocol translation.

18. The computer-readable storage medium of claim 17, wherein the protocol translation is a translation from an IMS format to a Digital Living Network Alliance (DLNA) format.

19. The computer-readable storage medium of claim 15, wherein converting the multimedia content from the first format to the second format comprises upgrading a quality of service associated with the multimedia content.

20. The computer-readable storage medium of claim 19, wherein the second electronic device is configured to support the upgraded quality of service, and wherein the IMS-enabled first electronic device is not configured to support the upgraded quality of service.

21. The computer-readable storage medium of claim 15, wherein the local network comprises a first local network, and wherein the computer-readable storage medium further comprises instructions for causing the one or more processors to:
receive, at the IMS enabled first electronic device, additional multimedia content having the first format via the IMS network;
convert, at the IMS-enabled first electronic device, the additional multimedia content from the first format to a third format that is different from the first format; and
transmit, from the IMS-enabled first electronic device to a third electronic device, the converted additional multimedia content in the third format, wherein the converted additional multimedia content is transmitted from the IMS-enabled first electronic device to the third electronic device via a second local network that is different from the IMS network and is different from the first local network.

22. The computer-readable storage medium of claim 15, further comprising instructions for causing the one or more processors to:
receive additional multimedia content at the IMS-enabled first electronic device via the local network from a third electronic device; and
transmit the additional multimedia content to an IMS-enabled electronic device via the IMS network.

23. The computer-readable storage medium of claim 15, wherein additional multimedia content is received at the second electronic device from a third electronic device via the local network.

24. The computer-readable storage medium of claim 15, wherein additional multimedia content is received at the second electronic device from a third electronic device via the IMS network.

25. The computer-readable storage medium of claim 15, further comprising instructions for causing the one or more processors to:
convert, at the IMS-enabled first electronic device, the multimedia content from the first format to a third format that is different from the first format and the second format; and
transmit, from the IMS-enabled first electronic device to a third electronic device, the converted multimedia content in the third format, wherein the converted multimedia content is transmitted from the IMS-enabled first electronic device to the third electronic device via the local network, and wherein the second and third formats are associated with different qualities of service.

26. An electronic device, comprising:
means for receiving, at an Internet Protocol Multimedia Subsystem (IMS) enabled first electronic device comprising a mobile device, multimedia content from a content-providing electronic device via an IMS network, the multimedia content having a first format;
means for converting, at the IMS-enabled first electronic device, the multimedia content from the first format to a second format that is different from the first format;
means for authenticating, at the IMS-enabled first electronic device, a second electronic device prior to transmitting the converted multimedia content from the IMS-enabled first electronic device to the second electronic device;
means for transmitting, from the IMS-enabled first electronic device to the authenticated second electronic device, the converted multimedia content being in the second format, wherein the converted multimedia content is transmitted from the IMS-enabled first electronic device to the second electronic device via a local network that is different from the IMS network, and the converted multimedia content is presented on the second electronic device;
means for receiving, at the IMS-enabled first electronic device while the converted multimedia content is being presented on the second electronic device, an input that indicates adjusting a presentation of the converted multimedia content on the second electronic device; and
means for transmitting, from the IMS-enabled first electronic device to the second electronic device via the local network, a command to adjust the presentation of the converted multimedia content responsive to the receipt of the input.

27. The electronic device of claim 26, wherein the second electronic device is not configured to receive communications via the IMS network.

28. The electronic device of claim 26, wherein the means for converting the multimedia content from the first format to the second format is based on a protocol translation.

29. The electronic device of claim 28, wherein the protocol translation is a translation from an IMS format to a Digital Living Network Alliance (DLNA) format.

30. The electronic device of claim 26, wherein the means for converting the multimedia content from the first format to the second format comprises means for upgrading a quality of service associated with the multimedia content.

31. The electronic device of claim 30, wherein the second electronic device is configured to support the upgraded quality of service, and wherein the IMS-enabled first electronic device is not configured to support the upgraded quality of service.

32. The electronic device of claim 26, wherein the local network comprises a first local network, and wherein the electronic device further comprises:
means for receiving, at the IMS enabled first electronic device, additional multimedia content having the first format via the IMS network;
means for converting, at the IMS-enabled first electronic device, the additional multimedia content from the first format to a third format that is different from the first format; and
means for transmitting, from the IMS-enabled first electronic device to a third electronic device, the converted additional multimedia content in the third format, wherein the converted additional multimedia content is transmitted from the IMS-enabled first electronic device to the third electronic device via a second local network that is different from the IMS network and is different from the first local network.

33. The electronic device of claim 26, further comprising:
means for receiving additional multimedia content at the IMS-enabled first electronic device via the local network from a third electronic device; and
means for transmitting the additional multimedia content to an IMS-enabled electronic device via the IMS network.

34. The electronic device of claim 26, wherein additional multimedia content is received at the second electronic device from a third electronic device via the local network.

35. The electronic device of claim 26, wherein additional multimedia content is received at the second electronic device from a third electronic device via the IMS network.

36. The electronic device of claim 26, further comprising:
means for converting, at the IMS-enabled first electronic device, the multimedia content from the first format to a third format that is different from the first format and the second format; and
means for transmitting, from the IMS-enabled first electronic device to a third electronic device, the converted multimedia content in the third format, wherein the converted multimedia content is transmitted from the IMS-enabled first electronic device to the third electronic device via the local network, and wherein the second and third formats are associated with different qualities of service.

37. An electronic device, comprising:
an IMS-enabled mobile device, including:
one or more processors;
a first interface operable to receive multimedia content from a content-providing electronic device via an IMS network, the multimedia content having a first format;
a conversion module operable by the one or more processors to convert the multimedia content from the first format to a second format that is different from the first format;
an authentication module operable by the one or more processors to authenticate a second electronic device prior to transmitting the converted multimedia content to the second electronic device; and
a second interface operable to transmit, to the authenticated second electronic device, the converted multimedia content being in the second format, wherein the converted multimedia content is transmitted to the second electronic device via a local network that is different from the IMS network, and the converted multimedia content is presented on the second electronic device;
wherein the electronic device receives, while the converted multimedia content is being presented on the second electronic device, an input that indicates adjusting a presentation of the converted multimedia content on the second electronic device; and
the second interface transmits, to the second electronic device via the local network, a command to adjust the presentation of the converted multimedia content responsive to the receipt of the input.

38. The electronic device of claim 37, wherein the second electronic device is not configured to receive communications via the IMS network.

39. The electronic device of claim 37, wherein converting the multimedia content from the first format to the second format is based on a protocol translation.

40. The electronic device of claim 39, wherein the protocol translation is a translation from an IMS format to a Digital Living Network Alliance (DLNA) format.

41. The electronic device of claim 37, wherein converting the multimedia content from the first format to the second format comprises upgrading a quality of service associated with the multimedia content.

42. The electronic device of claim 41, wherein the second electronic device is configured to support the upgraded quality of service, and wherein the electronic device is not configured to support the upgraded quality of service.

43. The electronic device of claim 37, wherein the local network comprises a first local network, and wherein:
the first interface receives additional multimedia content having the first format via the IMS network;
the conversion module converts the additional multimedia content from the first format to a third format that is different from the first format; and
the second interface transmits, to a third electronic device, the converted additional multimedia content in the third format, wherein the converted additional multimedia content is transmitted to the third electronic device via a second local network that is different from the IMS network and is different from the first local network.

44. The electronic device of claim 37, wherein:
the second interface receives additional multimedia content via the local network from a third electronic device; and
the first interface transmits the additional multimedia content to an IMS-enabled electronic device via the IMS network.

45. The electronic device of claim 37, wherein additional multimedia content is received at the second electronic device from a third electronic device via the local network.

46. The electronic device of claim 37, wherein additional multimedia content is received at the second electronic device from a third electronic device via the IMS network.

47. The electronic device of claim 37, wherein:
the conversion module converts the multimedia content from the first format to a third format that is different from the first format and the second format; and
the second interface transmits, to a third electronic device, the converted multimedia content in the third format, wherein the converted multimedia content is transmitted to the third electronic device via the local network, and wherein the second and third formats are associated with different qualities of service.

* * * * *